United States Patent
Bernhold et al.

(10) Patent No.: US 10,848,400 B2
(45) Date of Patent: Nov. 24, 2020

(54) NETWORK ENTITY FOR MONITORING A PLURALITY OF PROCESSES OF A COMMUNICATION SYSTEM

(71) Applicant: Deutsche Telekom AG, Bonn (DE)

(72) Inventors: Christian Bernhold, Gaimersheim (DE); Dominik Kalesse, Trostberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 150 days.

(21) Appl. No.: 15/759,527

(22) PCT Filed: Sep. 16, 2016

(86) PCT No.: PCT/EP2016/071961
§ 371 (c)(1),
(2) Date: Mar. 13, 2018

(87) PCT Pub. No.: WO2017/050650
PCT Pub. Date: Mar. 30, 2017

(65) Prior Publication Data
US 2019/0149439 A1   May 16, 2019

(30) Foreign Application Priority Data
Sep. 21, 2015   (DE) .................. 10 2015 115 898

(51) Int. Cl.
*G06F 15/16* (2006.01)
*H04L 12/26* (2006.01)
(Continued)

(52) U.S. Cl.
CPC ............ *H04L 43/045* (2013.01); *H04L 41/22* (2013.01); *H04L 67/36* (2013.01)

(58) Field of Classification Search
CPC .................................................... H04L 43/045
(Continued)

(56) References Cited

U.S. PATENT DOCUMENTS

| 6,593,940 B1* | 7/2003 | Petersen | G06F 11/3636 |
| | | | 714/38.1 |
| 8,230,437 B2* | 7/2012 | Leeman, Jr. | G06F 9/524 |
| | | | 718/104 |

(Continued)

FOREIGN PATENT DOCUMENTS

EP     0903890 A2    3/1999
EP     1408439 A1    4/2004

*Primary Examiner* — Hamza N Algibhah
(74) *Attorney, Agent, or Firm* — Leydig, Voit & Mayer, Ltd.

(57) ABSTRACT

A network entity for monitoring a plurality of processes of a communication system includes: a receiver, configured to receive communication data of the plurality of processes of the communication system; a processor, configured to: capture a process characteristic for each process on the basis of the communication data and to allocate the respective process to a process level of a process hierarchy according to the captured process characteristic; and check a process status for each process in order to detect a process with a critical process status; and a display, configured to illustrate the process levels of the process hierarchy and to graphically highlight a process level to which the process with the critical process status is allocated.

19 Claims, 6 Drawing Sheets

(51) Int. Cl.
*H04L 29/08* (2006.01)
*H04L 12/24* (2006.01)

(58) Field of Classification Search
USPC ........................................................ 709/224
See application file for complete search history.

(56) References Cited

U.S. PATENT DOCUMENTS

| | | | |
|---|---|---|---|
| 9,223,598 B1* | 12/2015 | Koryakina | G06F 9/455 |
| 10,346,287 B1* | 7/2019 | Dillon | G06F 11/362 |
| 2005/0076113 A1* | 4/2005 | Klotz | H04L 43/00 |
| | | | 709/224 |
| 2008/0034313 A1* | 2/2008 | Hildebrand | H04L 41/16 |
| | | | 715/772 |
| 2008/0184252 A1* | 7/2008 | Leeman | G06F 9/524 |
| | | | 718/104 |
| 2009/0171731 A1* | 7/2009 | Bobak | G06Q 10/06313 |
| | | | 705/7.23 |
| 2011/0066973 A1* | 3/2011 | Plom | G06F 11/323 |
| | | | 715/808 |
| 2011/0191609 A1* | 8/2011 | Van Bokhoven | G06F 1/3203 |
| | | | 713/310 |
| 2012/0041858 A1* | 2/2012 | Lewis | G06Q 10/04 |
| | | | 705/34 |
| 2013/0031086 A1* | 1/2013 | Strelec | G06F 16/2465 |
| | | | 707/722 |
| 2014/0157178 A1* | 6/2014 | Adams | G06F 3/0486 |
| | | | 715/772 |
| 2015/0149475 A1* | 5/2015 | Nakahira | G06K 9/6296 |
| | | | 707/741 |
| 2017/0061276 A1* | 3/2017 | Riley | G16C 20/70 |
| 2017/0068705 A1* | 3/2017 | Rinke | G06F 9/50 |
| 2017/0222873 A1* | 8/2017 | Lee | H04L 41/12 |
| 2019/0166017 A1* | 5/2019 | Chou | H04L 41/5012 |

* cited by examiner

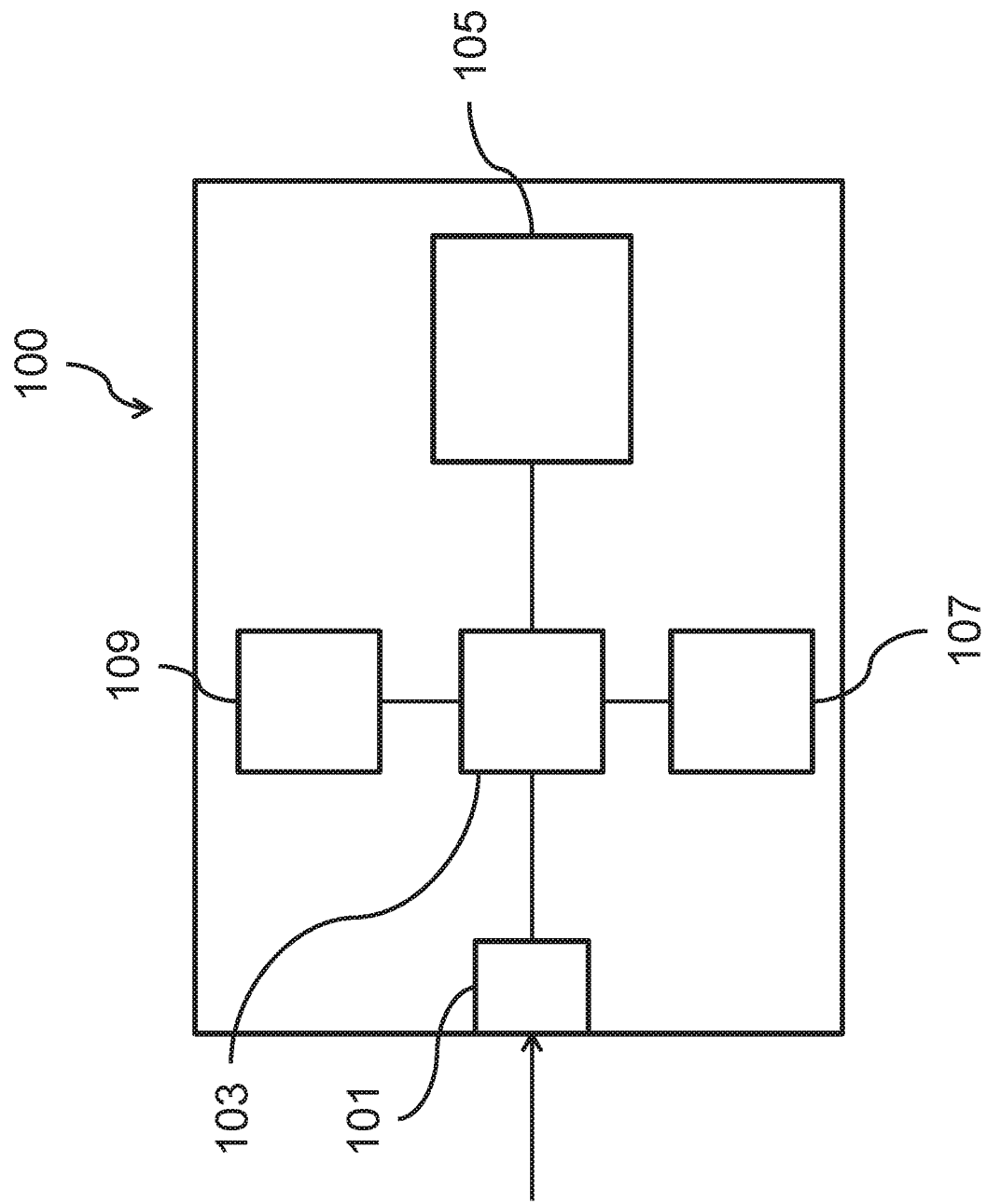

NETWORK ENTITY FOR MONITORING A PLURALITY OF PROCESSES OF A COMMUNICATION SYSTEM

CROSS-REFERENCE TO RELATED APPLICATIONS

This application is a U.S. National Phase application under 35 U.S.C. § 371 of International Application No. PCT/EP2016/071961, filed on Sep. 16, 2016, and claims benefit to German Patent Application No. DE 10 2015 115 898.1, filed on Sep. 21, 2015. The International Application was published in German on Mar. 30, 2017 as WO 2017/050650 A1 under PCT Article 21(2).

FIELD

The present disclosure relates to the field of monitoring communication systems. In particular, the disclosure relates to a network entity for monitoring a plurality of processes of a communication system.

BACKGROUND

Complex technical systems, in particular communication systems, frequently include a large number of processes which on their part include further technical systems. A communication system can, for example, comprise a variety of communication devices, control devices, computer systems or sensors which are interconnected using communication technology, but are at different locations. Due to the high complexity of the communication system, it is often difficult to monitor the processes of such a communication system and to visualize them in a simple and well-arranged way.

Furthermore, due to the large amounts of data and the large number of processes in a communication system, it is often difficult to identify an individual faulty process of the communication system. Complex communication systems are usually monitored directly at the location of the communication system processes to be monitored. However, due to the personnel required to this end and the monitoring technologies used on-site, high costs can accrue.

SUMMARY

In an exemplary embodiment, the present invention provides a network entity for monitoring a plurality of processes of a communication system. The network entity includes: a receiver, configured to receive communication data of the plurality of processes of the communication system; a processor, configured to: capture a process characteristic for each process on the basis of the communication data and to allocate the respective process to a process level of a process hierarchy according to the captured process characteristic; and check a process status for each process in order to detect a process with a critical process status; and a display, configured to illustrate the process levels of the process hierarchy and to graphically highlight a process level to which the process with the critical process status is allocated.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic diagram of a network entity.

DETAILED DESCRIPTION

Figure 2A:
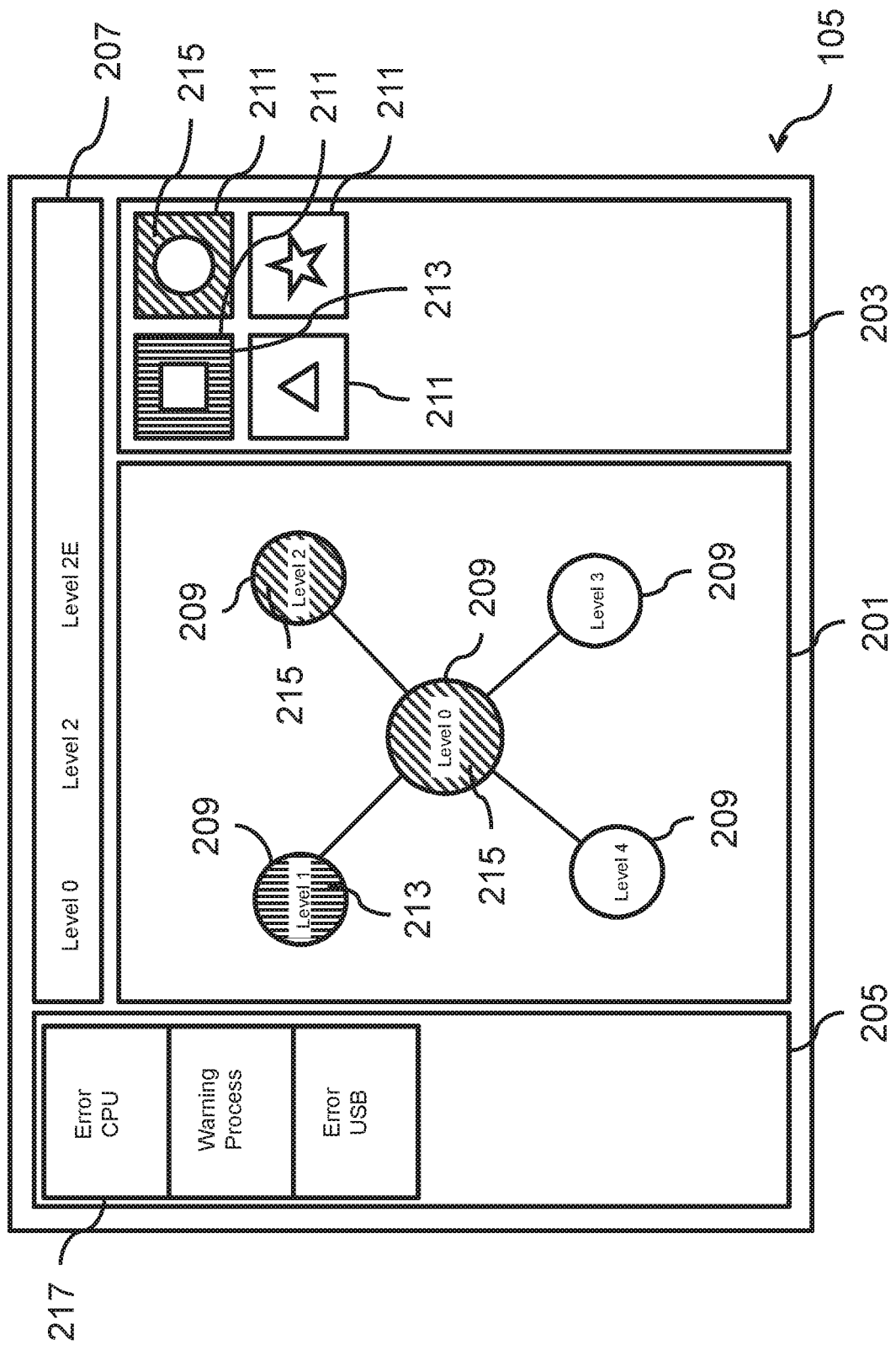
FIG. 2a shows a schematic diagram of a display.

Exemplary embodiments of the present disclosure provide for efficient monitoring of a plurality of processes of a communication system.

In an exemplary embodiment, a network entity includes a processor and a display, wherein the processor is configured to allocate processes of a communication system to a process hierarchy on the basis of a captured process characteristic of a process level, and to check a process status for each process, and wherein the display is configured to represent the process levels of the process hierarchy and to graphically highlight that process level to which a process with a critical process status is allocated. The process characteristic is captured on the basis of the process communication data which can be received by a receiver of the network entity.

According to a first aspect, the disclosure relates to a network entity for monitoring a plurality of processes of a communication system comprising a receiver for receiving communication data from the plurality of processes of the communication system; a processor which is configured to capture a process characteristic for each process on the basis of the communication data, and to allocate the respective process to a process level of a process hierarchy according to the captured process characteristic; wherein the processor is further configured to check a process status for each process in order to detect a process with a critical process status; and a display which is configured to illustrate the process levels of the process hierarchy and to graphically highlight that process level to which the process with the critical process status is allocated. This provides the advantage that the processes of the communication system can be efficiently and easily checked. By graphically highlighting the process level to which a process with critical status is allocated in the display, a user can quickly see in which process levels of the process hierarchy there are processes in the critical condition without having to individually check all process levels or processes to this end.

The network entity can comprise a computer program or an application, in particular a web application or an app. The application or the computer program can be installed or stored on a computer, a communication device, for example a smart phone, and/or a server.

The communication system can comprise a communication device, a control device, a control system, a vehicle system, a sensor system, in particular sensor units which are connected using communication technology, an information system or a data processing system. The communication system can be connected to a communication network, for example a local communication network, or the Internet.

The receiver can comprise a communication interface which can be configured to receive communication data via the communication network.

The processes can be components of the communication system. If the communication system comprises, for example, a computer, the processes can be hardware components of the computer, for example a hard disk, a drive, a central processing unit (CPU), a user memory, a network card, a graphic card or a port, for example a Universal Serial Bus (USB) port. The processes can be allocated to different process levels in the process hierarchy, for example according to their function, their affiliation or their energy consumption. Allocation can be accomplished according to an allocation rule defined or created by a user on the basis of the process characteristic.

The process characteristic can comprise a process ID, in particular a UIN (unique identification number). The network entity can comprise a table, in particular a look-up table, where the process IDs are stored, and via which the communication data can be allocated to the processes. Furthermore, positions in the process hierarchy, in particular a process level of the processes and the respective thresholds of the processes, can be stored in the table. The table or the process hierarchy stored in the table can be stored in the server as digital code. The received communication data, for example measured values, can be recorded in the table and also stored as digital code.

The process hierarchy can be manually created by a user for a communication system and, for example, stored in the server as digital code.

The process hierarchy can be a hierarchical structure of the process levels and the processes of the communication system. The process levels can be nodes in the process hierarchy. The processes can be allocated to different process levels. The process levels and the processes can be represented as objects in the hierarchical structure. In particular, the process levels can comprise so-called items and the processes can comprise so-called tasks in the hierarchical structure.

The display can comprise a graphical user interface. The display can be shown on a display device of a communication device, for example a display of a smart phone or a laptop. The communication device can be connected with the network entity using communication technology in order to receive the display. This connection can be accomplished via a wireless connection so that the communication device does not need to be at the same place as the communication system to be checked or the network entity. This provides the advantage that a communication system can be checked or monitored from different locations with different communication devices.

According to an embodiment, the processor is configured to capture an information value for each process of the communication system on the basis of the communication data and to compare each captured information value with a threshold allocated to the respective process in order to check the process status of the respective process. This provides the advantage that the process status can be efficiently investigated by comparing the captured information value with a parameter specified by a user.

According to an embodiment, the processor is configured to determine the critical process status of the respective process if the information value exceeds the threshold. This provides the advantage that the critical process status can be efficiently determined.

According to an embodiment, the display is configured to graphically highlight that process level to which the process with the critical process status is allocated via a colored marking. This provides the advantage that a process level to which a process with critical process status is allocated can be efficiently and quickly detected by a user. The colored marking can be a colored background or a colored representation of the process level in the display.

According to an embodiment, the display is configured to illustrate the process levels of the process hierarchy to which at least one process is allocated. This provides the advantage that a clearly laid-out representation of the process hierarchy or a section of the process hierarchy can be shown on the display.

According to an embodiment, the display is configured to graphically highlight the processes allocated to the process levels and the process with the critical process status. This provides the advantage that a user can efficiently and quickly capture all processes of the communication device, in particular the process with the critical process status.

According to an embodiment, the display is configured to graphically highlight the process with the critical process status via a colored marking.

According to an embodiment, the display comprises a first display section in which the process levels of the process hierarchy and/or the processes are illustrated in a tree structure. This provides the advantage that a clearly laid-out representation of the process hierarchy or a section of the process hierarchy can be shown on the display.

According to an embodiment, the display comprises a second display section in which the process levels of the process hierarchy and/or the processes which are allocated to a process level are symbolically represented. This provides the advantage that a clearly laid-out representation of the process hierarchy or a section of the process hierarchy can be shown on the display.

According to an embodiment, the display comprises a third display section in which all processes are shown which have a critical process status. This provides the advantage that a user can quickly and efficiently detect all processes with a critical process status.

According to an embodiment, the network entity comprises a user interface to allow for the selection of a process level of the process hierarchy or a process. This provides the advantage that a user can select specific processes or process levels, for example in order to navigate through the process levels of the process hierarchy.

Furthermore, the user interface can allow for the modification of a respective threshold of a selected process, or for the adjustment or calibration of the display.

According to an embodiment, the display comprises a fourth display section in which the process levels of the process hierarchy are shown in order to allow for the selection of individual process levels of the process hierarchy. This provides the advantage that a user can efficiently navigate through the process levels.

According to an embodiment, the processor is configured to capture additional process information for each process on the basis of the communication data, and the display is configured to illustrate the additional process information of the respective process during selection of a process. This provides the advantage that a user can efficiently retrieve the additional process information.

The additional process information can comprise information on the duration or frequency of use of the process, a current or average energy consumption of the process, the frequency of a critical condition of the process or the current process status.

According to an embodiment, the processor is configured to compare each captured information value of a process with a further threshold allocated to the respective process in order to check a further status of the respective process. This provides the advantage that the further process status can be efficiently identified by comparing the captured information value with a further parameter specified by a user.

According to an embodiment, the processor is configured to identify a further critical process status of the respective process if the information value exceeds the further threshold, and the display is configured to graphically highlight that process level to which the process with the further critical process status is allocated. This provides the advantage that the further critical process status can be efficiently determined and detected by a user in the display.

According to an embodiment, the display is configured to graphically highlight that process level to which the process with the further critical process status is allocated via a further colored marking, wherein the further colored marking replaces an already existing colored marking of the process level. This provides the advantage that a process level which comprises a process with the further critical process status can be efficiently marked and detected by a user.

According to an embodiment, the network entity is implemented by at least one of the following web technologies: AngularJS, Hypertext Markup Language (HTML), Cascading Style Sheets (CSS), Bootstrap, MySQL, Representational State Transfer (REST).

According to a second aspect, the disclosure relates to a method for monitoring a plurality of processes of a communication system, comprising receiving communication data of the plurality of processes of the communication system, capturing a process characteristic for each process on the basis of the communication data, allocating the respective process to a process level of a process hierarchy in accordance with the captured process characteristic, checking a process status for each process in order to detect a process with a critical process status, illustrating the process levels of the process hierarchy, and graphically highlighting the process levels to which the process with the critical process status is allocated. This provides the advantage that the processes of the communication system can be efficiently and easily checked.

According to a third aspect, the disclosure relates to a computer program or an application, in particular a web application with a program code for executing the method according to the second aspect of the disclosure if it is executed on a computer or a communication device. The communication device can be a smart phone.

The disclosure can be implemented in software and/or hardware.

FIG. 1 shows a network entity 100 for monitoring a plurality of processes of a communication system according to an embodiment.

The network entity 100 comprises a receiver 101 for receiving the communication data of a plurality of processes of the communication system, a processor 103 which is configured to capture a process characteristic for each process on the basis of the communication data and to allocate the respective process to a process level of a process hierarchy according to the captured process characteristic, wherein the processor 103 is also configured to check a process status for each process in order to detect a process with a critical process status, and a display 105 which is configured to illustrate the process levels of the process hierarchy and to graphically highlight that process level to which the process with the critical process status is allocated.

The network entity 100 can include a computer program or an application, in particular a web application or an app. The application of the computer program can be installed or stored on a computer, a communication device, for example a smart phone, and/or a server.

The communication system can be a communication device, a control device, a control system, a vehicle system, a sensor system, in particular sensor units which are connected using communication technology, an information system or a data processing system. The communication system can be connected to a communication network, for example a local communication network, or the Internet.

The receiver 101 can comprise a communication interface which can be configured to receive communication data via the communication network.

The processes can be components of the communication system. If the communication system comprises, for example, a computer, the processes can be hardware components of the computer, for example a hard disk, a drive, a CPU, a user memory, a network card, a graphic card or a port, for example a USB port. The processes can be allocated to different process levels in the process hierarchy, for example according to their function, their affiliation or their energy consumption. Allocation can be accomplished according to an allocation rule defined or created by a user on the basis of the process characteristic.

The process characteristic can comprise a process ID, in particular a UIN (unique identification number). The network entity 100 can comprise a table, in particular a look-up table, where the process IDs are stored and via which the communication data can be allocated to the processes. Furthermore, positions in the process hierarchy, in particular a process level of the processes and the respective thresholds of the processes, can be stored in the table. The table or the process hierarchy stored in the table can be stored in the server as digital code. The received communication data, for example measured values, can be entered in the table and also stored as digital code.

The process hierarchy can be manually created by the user for a communication system and, for example, stored in the server as digital code.

The display 105 can be or comprise a graphical user interface. The display can be shown on a display device of a communication device, for example a display of a smart phone or a laptop. The communication device can be connected with the network entity 100 using communication technology in order to receive the display 105. This connection can be accomplished via a wireless connection so that the communication device does not need to be at the same location as the communication system to be checked or the network entity 100. This provides the advantage that a communication system can be checked or monitored from different locations with different communication devices.

The network entity 100 in FIG. 1 further comprises a user interface 107. The user interface 107 can allow for the selection of processes or process levels in the display 105.

The user interface 107 can comprise an operating element or be connected with an operating element using communication technology. The operating element can be a touch display of a communication device on which the display 105 is shown.

The network entity 100 in FIG. 1 further comprises a memory 109. The memory 109 can be configured to store the process hierarchy, in particular of the process levels and of the processes, and/or the threshold which can be stored as digital code in the memory 109. Furthermore, the memory 109 can be configured to store the table, in particular the look-up table, and/or the allocation rule which regulates the allocation of the processes to the process levels of the process hierarchy. The table and/or the allocation rule can also be stored in the memory 109 as digital code. The memory 109 can include a data storage, for example a flash memory, of the computer, of the communication device or of the server.

FIG. 2a shows a schematic diagram of a display 105 according to an embodiment.

The display 105 comprises a first display section 201, a second display section 203, a third display section 205 and a fourth display section 207.

The display 105 in FIG. 2a shows the process levels 209 of the process hierarchy. The display 105 can also be configured to show the processes 219 of the communication system, such as illustrated in FIG. 2c.

According to an embodiment, the process level 209 comprises an item of the process hierarchy. The item can be a node in the process hierarchy. Furthermore, processes 219 can be allocated or subordinated to the item. According to an embodiment, a process 219 which is allocated to an item is a task.

According to another embodiment, further process levels or items can be superordinate or subordinate to an item in the process hierarchy. According to an embodiment, the superordinate or subordinate items are so-called root items or child items wherein root items are items of a superordinate process level 209, and child items are items of a subordinate process level 209.

According to an embodiment, the process hierarchy is a hierarchical structure of items and tasks.

According to another embodiment, the tasks are the last element of a branch of items in the process hierarchy, or no further tasks or items are allocated to the tasks in the process hierarchy. According to an embodiment, a task is classified as allocated to an item if the item is a root item of the task.

According to another embodiment, the display 105 comprises symbolically represented items and tasks, and the user can navigate through the display 105 or select the respective items or tasks by selecting or clicking on the items and tasks in the display 105, in particular in the first display section 201, the second display section 203, the third display section 205 or the fourth display section 207.

The first display section 201 in FIG. 2a shows process levels or items of the process hierarchy in a tree structure.

The first display section 201 of the display 105 comprises a central item of a process level (level 0) which is currently selected in the display 105 in FIG. 2a. In FIG. 2a, four child items are allocated to level 0 (level 1, level 2, level 3, and level 4). The items of level 0 as well as of levels 1 and 2 are graphically highlighted in FIG. 2a.

According to an embodiment, items can be graphically highlighted in the display 105 if a process or a task in a critical condition is allocated to them. The processor 103 can be configured to distinguish between warnings or warning conditions and errors or error conditions of the processes or tasks in case of critical conditions of the processes or tasks. The processor 103 can, for example, be configured to determine the warning condition of a task if the information value of the task or of the associated process 219 exceeds a threshold, and the process 219 is in a critical process condition. Furthermore, the processor 103 can be configured to determine the error or error condition of a task if the information value of the task or of the associated process 219 exceeds a further threshold, and the process 219 is in a further critical process condition.

According to an embodiment, the items in the tree structure can be marked with a color for graphical highlighting, in particular with a colored background or a colored representation. In this context, a first color 213 can be used for warnings and a second color 215 for errors. For example, the first color 213 can be yellow and the second color 215 can be red.

If several tasks or child items with a critical condition are allocated to an item, such as level 0 in FIG. 2a to which level 1 and level 2 are allocated, then the display 105 can be configured to mark the process level 209 only with the second color 215. In this way, the error can be prioritized if an error and a warning occur at the same time.

According to another embodiment, a connecting line in the tree structure between an item and a child item or root item or an allocated task can also be graphically highlighted, in particular marked with a color.

The second display section 203 comprises a symbolic representation of a number of items and/or tasks. In FIG. 2a, the second display section 203 comprises all child items of level 0.

According to an embodiment, the items and the tasks are symbolically represented in the form of navigation elements 211, in particular buttons or tiles, with representative symbols. In FIG. 2a, the user can see that a task with a critical or a further critical process status is allocated to these process levels 209, by the graphical highlighting of the navigation elements 211 of two items.

The second display section 203 can be used for item and task navigation. The user can navigate through the process levels 209 of the process hierarchy by selecting, for example by clicking on, a navigation element 211.

The third display section 205 comprises a list 217 which lists all tasks for which a warning or an error has been captured. According to an embodiment, the third display section 205 further comprises a panel or a system message panel. According to another embodiment, the user can sort or arrange the list 217, for example according to errors and warnings, or according to a process category.

According to another embodiment, the third display section 205 further comprises an infographic which illustrates an overview of a currently selected task or item. The infographic can show a chronological sequence, in particular a chronological sequence of error or warning messages.

The fourth display section 207 shows the process levels 209 of the process hierarchy and allows, for example, for the selection of individual process levels 209 of the process hierarchy.

According to an embodiment, the fourth display section 207 comprises a head section of the display 105. Furthermore, the fourth display section 207 can comprise a bar which can display a path of a process level 209 or a process, for example in order to navigate through the process levels 209 of the process hierarchy. The path can display a root item of a currently selected item or task, or the name of the currently selected item or task.

According to an embodiment, the fourth display section 207 further comprises further selection elements, in particular buttons, for the operation of the display 105 or the network entity 100, or for navigating through the process hierarchy.

According to another embodiment, the user can create shortcuts or bookmarks for various items or tasks in the fourth display section 207 in order to control and/or select them efficiently and quickly.

Figure 2B:
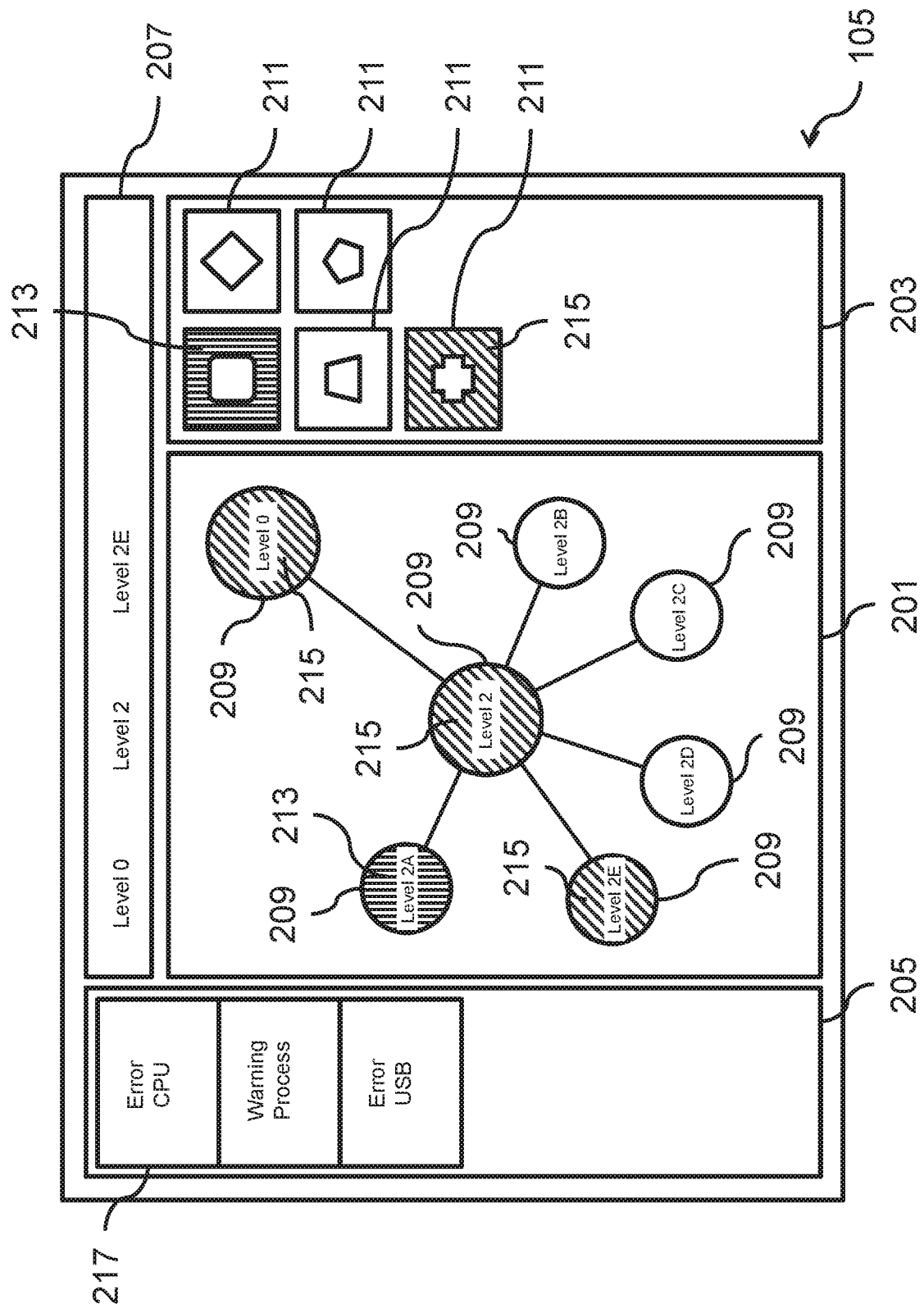
FIG. 2b shows a schematic diagram of a display.
Figure 2C:
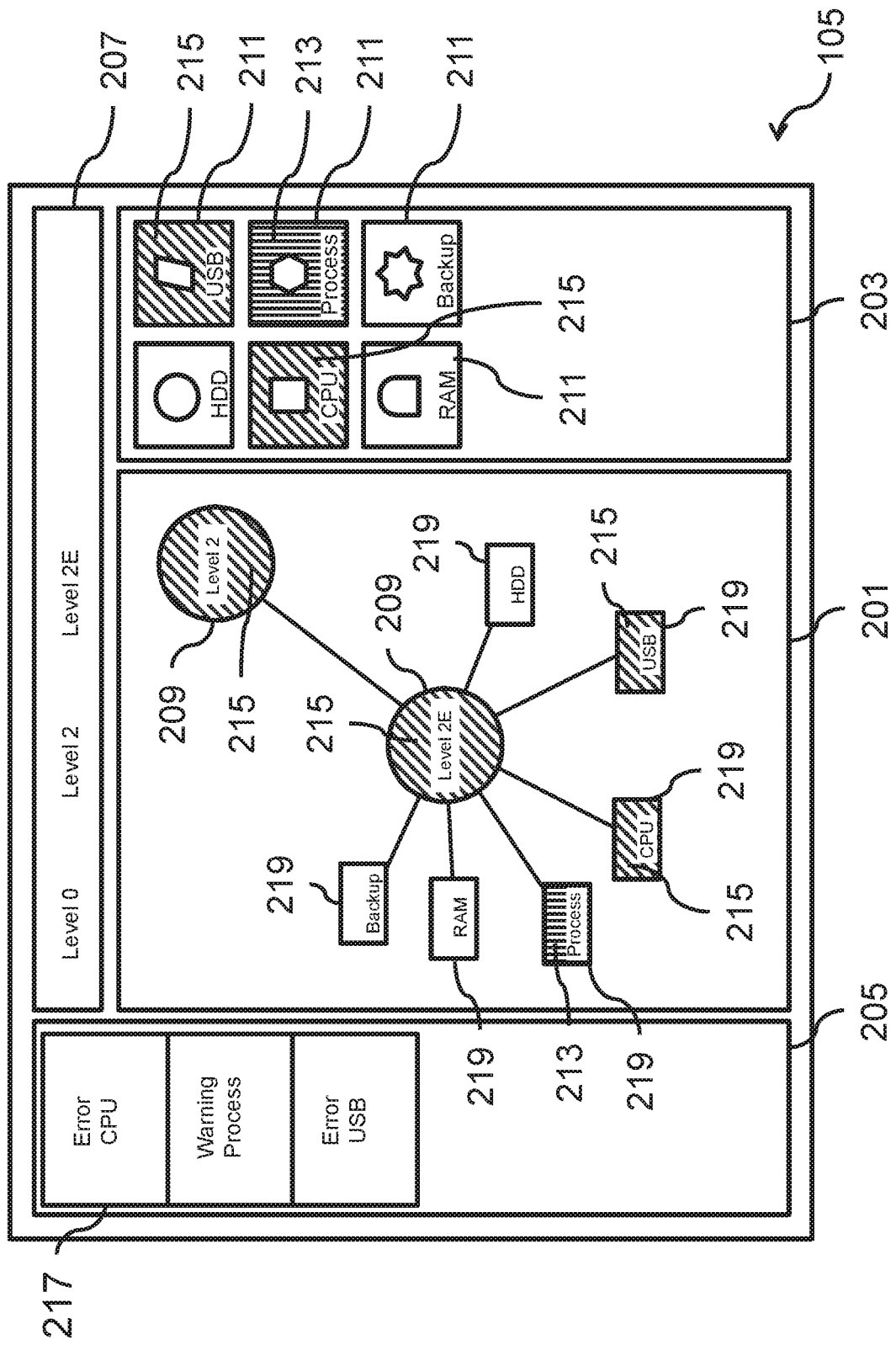
FIG. 2c shows a schematic diagram of a display.

FIG. 2b shows a schematic diagram of the display 105 according to another embodiment. In particular, FIG. 2b shows the example from FIG. 2a after the selection of level 2.

The tree structure in the first display section 201 and the navigation elements 211 in the second display section 203 in FIG. 2b comprise the child items of level 2. Furthermore, the error or warning messages are represented as colored highlighting of the items and can thus be further traced by the user. In FIG. 2b, the error extends into level 2E, which is a child item of level 2. By selecting a child item in the first display section 201 or in the second display section 203, the user can navigate into a next process level 209, for example level 2E.

FIG. 2c shows another schematic diagram of the display 105 according to another embodiment. In particular, FIG. 2c shows the example from FIG. 2b after the selection of level 2E.

In FIG. 2c, level 2E is a lowest process level 209 of the process hierarchy. The display 105 in FIG. 2c includes the processes or tasks which are allocated to level 2E in the process hierarchy.

In the exemplary illustration in FIG. 2c, the tasks include the hardware components of a computer. The "Process" task in FIG. 2c is in a critical condition and highlighted with the first color 213. The "CPU" task and the "USB" task are in a further critical condition and highlighted with the second color 215.

The tasks can be displayed like items in the tree structure of the first display level 201. Furthermore, the tasks in the second display section 203 can be illustrated as navigation elements 211 with representative symbols.

Figure 2D:
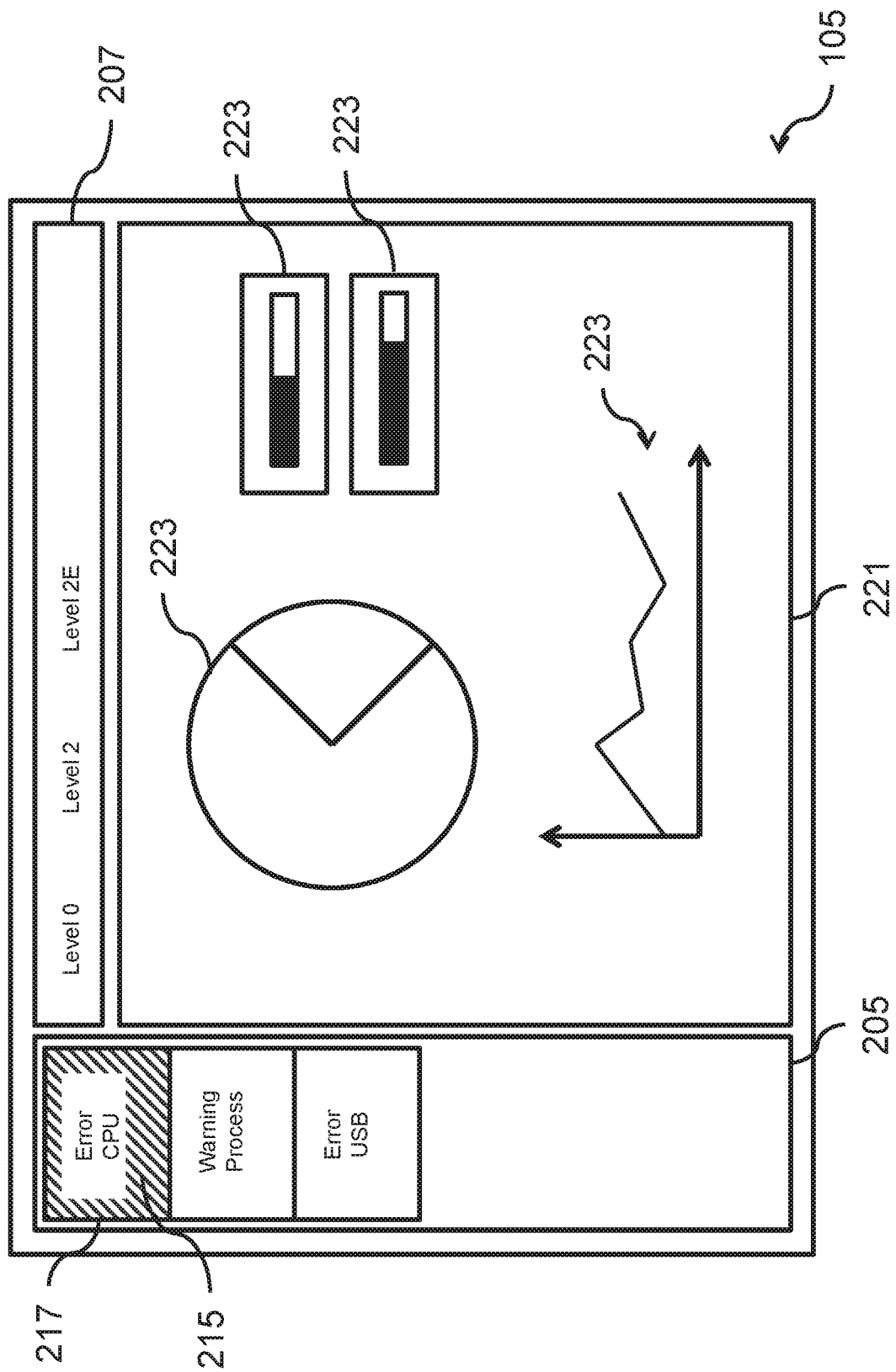
FIG. 2d shows a schematic diagram of a display.

FIG. 2d shows the example from FIG. 2c after the selection of a task. The task can be a task in a critical condition or a further critical condition, for example the CPU task or the USB task from FIG. 2c. Tasks can be selected by clicking on the task in the first display section 201, the second display section 203 or the third display section 205.

According to an embodiment, the processor 103 is configured to capture additional process information for each process 219 or each task on the basis of communication data.

According to an embodiment, the additional process information includes information on the duration or frequency of use of the process 219, a current or average energy consumption of the process 219, the frequency of a critical condition of the process 219 or the current process status.

According to another embodiment, the display 105 is configured to illustrate the additional process information of the respective process 219 during selection of a task 219.

FIG. 2d shows, by way of example, such an illustration of the additional process information. The representation can be implemented in a fifth display section 221. The fifth display section 221 can comprise display or input elements. Furthermore, the fifth display section 221 can replace the first display section 201 and/or the second display section 203 in the display 105.

According to an embodiment, the display elements comprise tables and/or graphics, and the display elements are configured to display the additional process information. The display elements can, for example, display the degree of capacity utilization or a chronological sequence of the use of the task.

According to another embodiment, the input elements are configured to enable the user to adjust the thresholds allocated to the selected task or processes 219. Furthermore, the input elements can be configured to enable the user to adjust or calibrate the display 105.

According to an embodiment, the user can access the input elements via the user interface 107.

According to another embodiment, the selected process 219 can be graphically highlighted in the list 217 in the third display section 205, for example by marking the process 219 in the list 217 with the first color 213 or the second color 215.

Figure 3:
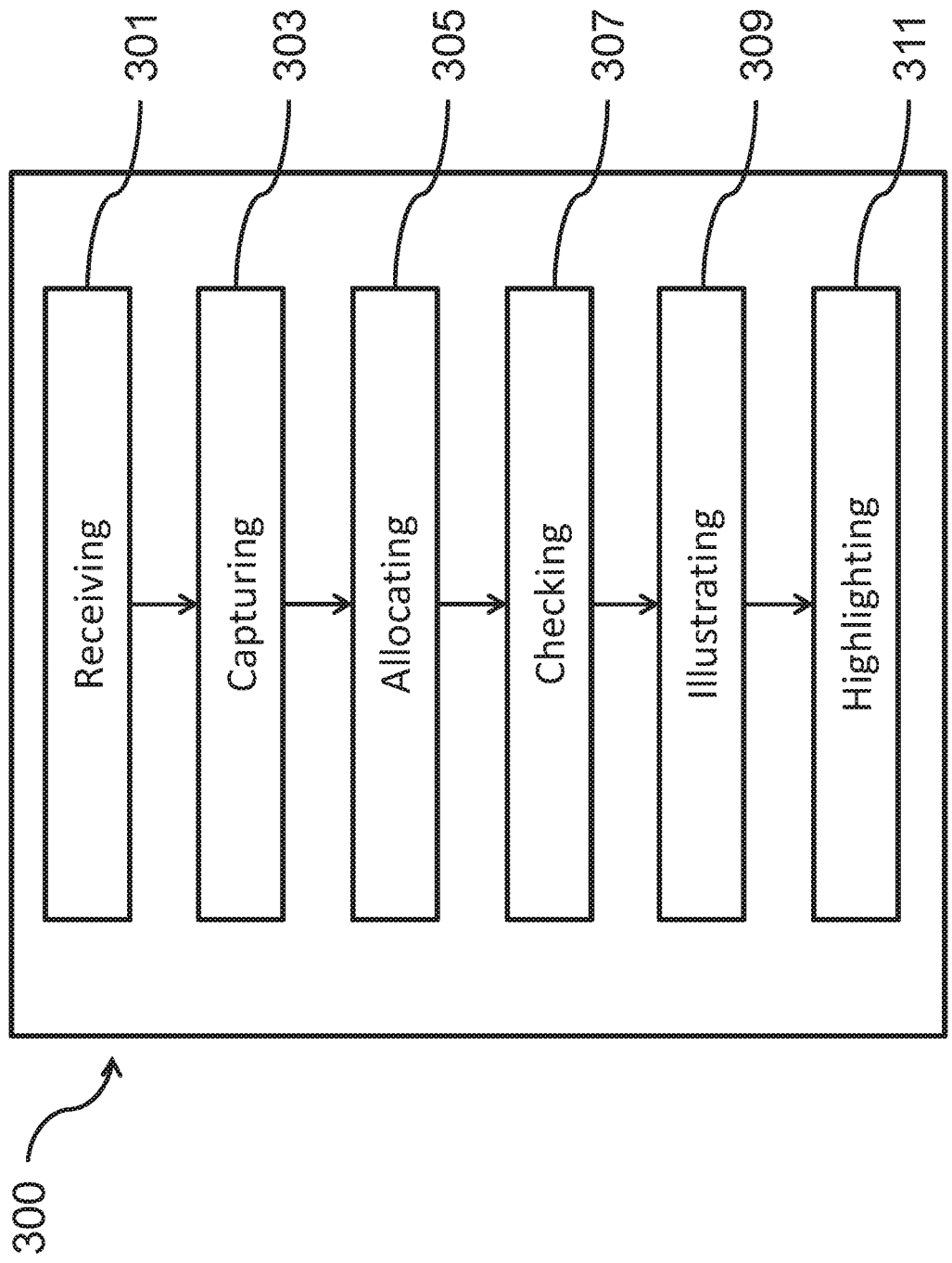
FIG. 3 shows a flow chart of a method for monitoring a plurality of processes of a communication system.

FIG. 3 shows a flow chart of a method 300 for monitoring the plurality of processes of the communication system.

The method 300 comprises receiving 301 communication data from the plurality of processes 219 of the communication system, capturing 303 a process characteristic for each process 219 on the basis of the communication data, allocating 305 the respective process 219 to a process level 209 of a process hierarchy according to the captured process characteristic, checking 307 a process status for each process 219 in order to detect a process 219 with a critical process status, illustrating 309 the process levels 209 of the process hierarchy, and graphically highlighting 311 the process levels 209 to which the process 219 with the critical process status is allocated.

According to another embodiment, the network entity 100 as a web application is independent of devices and/or platforms and can be used with various communication devices and/or with various operating systems. The computer program or the application can require a user to log in for authorization before use. According to another embodiment, the network entity 100 is configured to submit a warning or error message to the communication device if a critical process status has been determined in order to inform the user about the critical process status. The user has the option of deactivating this messaging function.

By an external use of the network entity 100, for example via a smart phone, it is, for example, no longer necessary that persons stay at the location of the communication system or of the processes 219 of the communication system for monitoring the communication system. This can result in significant cost savings for the monitoring of the processes 219.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A network entity for monitoring a plurality of processes of a communication system, comprising:
   a memory, configured to store a look-up table, wherein the look-up table includes respective process IDs of respective processes and respective process levels of a process hierarchy corresponding to respective processes;
   a receiver, configured to receive communication data of the plurality of processes of the communication system, wherein the communication data includes measured values, and wherein the communication system comprises multiple devices or components in communication with one another;
   a processor, configured to:
      allocate the communication data to respective processes based on the look-up table;
      capture a process characteristic for each process on the basis of the communication data;
      allocate, based on the look-up table, a respective process to a respective process level of the process hierarchy according to the captured process characteristic for the respective process;
      check a process status for each process to detect one or more processes having an error status and one or more processes having a warning status;
      output, on a display, a user interface which illustrates a plurality of process levels of the process hierarchy and which illustrates one or more relationships between the plurality of process levels;
      graphically highlight, in the user interface, a first process level corresponding to a first process having the error status in a first manner, wherein the first process is allocated to the first process level; and
      graphically highlight, in the user interface, a second process level corresponding to a second process having the warning status in a second manner different from the first manner, wherein the second process is allocated to the second process level.

2. The network entity according to claim 1, wherein the look-up table further includes respective thresholds corresponding to respective processes, and wherein the processor is further configured to capture an information value for each process of the communication system on the basis of the communication data and to compare each captured information value with a threshold allocated to the respective process in order to check the process status of the respective process.

3. The network entity according to claim 2, wherein the processor is configured to determine that the respective process has a first critical process status based on the information value exceeding the threshold, wherein the first critical process status corresponds to the warning status.

4. The network entity according to claim 1, wherein the first process level is graphically highlighted in the user interface in the first manner via a colored marking.

5. The network entity according to claim 1, wherein the user interface further illustrates the first process and the allocation of the first process to the first process level, wherein the first process is graphically highlighted in the first manner.

6. The network entity according to claim 1, wherein the user interface comprises:
   a first display section in which the plurality of process levels and/or the plurality of processes are illustrated in a tree structure that includes the one or more relationships between process levels, between processes, and/or between process levels and processes;
   a second display section, separate from the first display section, in which the plurality of process levels and/or the plurality of processes are represented by symbols corresponding to navigation elements; and
   a third display section, separate from the first and second display sections, in which the one or more processes having the error status and the one or more processes having the warning status are listed.

7. The network entity according to claim 1, wherein the processor is further configured to receive user input via the user interface corresponding to a selection of a process level or a process.

8. The network entity according to claim 7, wherein the processor is further configured to output, via the user interface, in response to the user input, additional information relating to the selected process level or process.

9. The network entity according to claim 2, wherein the processor is further configured to compare each captured information value with a further threshold allocated to the respective process in order to obtain a further status of the respective process.

10. The network entity according to claim 9, wherein the processor is further configured to determine a further critical process status of the respective process based on the information value exceeding the further threshold, and wherein the processor is further configured to graphically highlight a process level to which the process with the further critical process status is allocated, wherein the further critical process status corresponds to the error status.

11. The network entity according to claim 10, wherein the display is further configured to graphically highlight the process level to which the process with the further critical process status is allocated via a further colored marking, wherein the further colored marking replaces an already existing colored marking of the process level.

12. The network entity according to claim 1, wherein the network entity utilizes at least one of the following web technologies: AngularJS, Hypertext Markup Language (HTML), Cascading Style Sheets (CSS), Bootstrap, MySQL, Representational State Transfer (REST).

13. The network entity according to claim 1, wherein respective processes are grouped into respective process levels according to energy consumption.

14. The network entity according to claim 1, wherein respective processes are grouped into respective process levels according to function.

15. The network entity according to claim 1, wherein respective processes are grouped into respective process levels according to affiliation.

16. The network entity according to claim 8, wherein the additional information relating to the selected process level or process includes information regarding duration or frequency of use.

17. The network entity according to claim 8, wherein the additional information relating to the selected process level or process includes information regarding current or average energy consumption.

18. The network entity according to claim 8, wherein the additional information relating to the selected process level or process includes information regarding frequency of critical conditions.

19. A method for monitoring a plurality of processes of a communication system, comprising:
- receiving, by a network entity, communication data of the plurality of processes of the communication system, wherein the communication data includes measured values, and wherein the communication system comprises multiple devices or components in communication with one another;
- allocating, by the network entity, the communication data to respective processes based on the look-up table, wherein the look-up table includes respective process IDs of respective processes and respective process levels of a process hierarchy corresponding to respective processes;
- capturing, by the network entity, a process characteristic for each process on the basis of the communication data;
- allocating, by the network entity, based on the look-up table, a respective process to a respective process level of the process hierarchy according to the captured process characteristic for the respective process;
- checking, by the network entity, a process status for each process to detect one or more processes having an error status and one or more processes having a warning status;
- outputting, by the network entity, on a display, a user interface which illustrates a plurality of process levels of the process hierarchy and which illustrates one or more relationships between the plurality of process levels;
- graphically highlighting, by the network entity, in the user interface, a first process level corresponding to a first process having the error status in a first manner, wherein the first process is allocated to the first process level; and
- graphically highlighting, by the network entity, in the user interface, a second process level corresponding to a second process having the warning status in a second manner different from the first manner, wherein the second process is allocated to the second process level.

* * * * *